United States Patent
Prieto

(10) Patent No.: US 8,342,821 B2
(45) Date of Patent: Jan. 1, 2013

(54) TUNED BEARING

(75) Inventor: Carlos A Prieto, Tulsa, OK (US)

(73) Assignee: Baker Hughes Incorporated, Houston, TX (US)

( * ) Notice: Subject to any disclaimer, the term of this patent is extended or adjusted under 35 U.S.C. 154(b) by 302 days.

(21) Appl. No.: 12/909,238

(22) Filed: Oct. 21, 2010

(65) Prior Publication Data

US 2012/0098358 A1    Apr. 26, 2012

(51) Int. Cl.
   *F04B 35/01*    (2006.01)
   *F16F 7/10*     (2006.01)
   *F16F 7/00*     (2006.01)
   *H02K 5/24*     (2006.01)
   *H02K 5/132*    (2006.01)

(52) U.S. Cl. ......... 417/423.12; 310/51; 310/87; 310/90; 384/99; 188/378; 267/140.4; 267/141.2; 267/293

(58) Field of Classification Search ............ 310/51, 310/87, 90; 384/99; 417/423.12; 267/140.4, 267/140.11, 141, 141.2, 141.3, 293; 188/378
See application file for complete search history.

(56) References Cited

U.S. PATENT DOCUMENTS

| | | | |
|---|---|---|---|
| 1,169,206 A | 1/1916 | Sydney | |
| 1,907,823 A | 5/1933 | Janson | |
| 2,621,090 A | 12/1952 | Lakey | |
| 3,154,355 A | 10/1964 | McCafferty | |
| 3,158,415 A | 11/1964 | Gardner | |
| 3,183,048 A | 5/1965 | Komor | |
| 3,318,642 A | 5/1967 | Peterson | |
| 3,326,612 A | 6/1967 | Schaefer | |
| 3,578,827 A | 5/1971 | Smith | |
| 3,720,271 A | 3/1973 | Kern | |
| RE28,094 E * | 7/1974 | Boyd | 310/90 |
| 3,988,046 A | 10/1976 | Okano | |
| 4,033,647 A | 7/1977 | Beavers | |
| 4,097,094 A | 6/1978 | Gardner | |
| 4,227,865 A | 10/1980 | Erickson et al. | |
| 4,275,938 A | 6/1981 | Roberts | |
| 4,300,808 A | 11/1981 | Yoshioka | |
| 4,363,608 A | 12/1982 | Mulders | |
| 4,435,661 A * | 3/1984 | Witten | 310/90 |
| 4,457,634 A | 7/1984 | Vinciguerra | |
| 4,513,215 A * | 4/1985 | Del Serra | 310/90 |

(Continued)

FOREIGN PATENT DOCUMENTS

JP       10110694 A    4/1998

(Continued)

OTHER PUBLICATIONS

International Search Report and Written Opinion (PCT/US2011/052534), dated Apr. 18, 2012.

*Primary Examiner* — Burton Mullins
(74) *Attorney, Agent, or Firm* — Bracewell & Giuliani LLP

(57) ABSTRACT

A bearing assembly for a submersible pump motor has a bearing body, having a hub, an outer portion, and a plurality of wing portions. The wing portions are spaced apart to form a plurality of cavities in the bearing body. A mass damper is mounted to the hub. The mass damper has an upper portion, a lower portion and mass damper prongs connecting the upper and lower portion. The mass damper prongs are disposed in the cavities, and act to reduce the amplitude of the vibrating frequency of the motor shaft.

17 Claims, 4 Drawing Sheets

U.S. PATENT DOCUMENTS

| | | | |
|---|---|---|---|
| 4,638,198 A * | 1/1987 | Cochran | 310/87 |
| 4,668,108 A | 5/1987 | McHugh | |
| 4,669,961 A | 6/1987 | Lorett | |
| 4,749,283 A | 6/1988 | Yokomatsu et al. | |
| 4,802,774 A | 2/1989 | Pesikov | |
| 4,815,865 A | 3/1989 | Gerling | |
| 5,003,210 A | 3/1991 | Liu et al. | |
| 5,033,937 A | 7/1991 | Wilson | |
| 5,056,763 A * | 10/1991 | Hamada et al. | 267/141 |
| 5,128,573 A * | 7/1992 | Liu et al. | 310/87 |
| 5,160,240 A | 11/1992 | Wilson | |
| 5,425,584 A | 6/1995 | Ide | |
| 5,603,574 A | 2/1997 | Ide et al. | |
| 5,613,781 A | 3/1997 | Kuzdzal et al. | |
| 5,660,256 A * | 8/1997 | Gallmeyer et al. | 188/379 |
| 5,667,314 A | 9/1997 | Limanowka et al. | |
| 5,722,812 A | 3/1998 | Knox et al. | |
| 5,743,654 A | 4/1998 | Ide et al. | |
| 5,765,950 A | 6/1998 | Eno et al. | |
| 5,872,875 A | 2/1999 | Halloran et al. | |
| 6,063,001 A | 5/2000 | Suhling et al. | |
| 6,068,444 A | 5/2000 | Sheth | |
| 6,091,175 A | 7/2000 | Kinsinger | |
| 6,099,271 A | 8/2000 | Brookbank | |
| 6,196,721 B1 | 3/2001 | Farkaly | |
| 6,300,699 B1 | 10/2001 | Parmeter | |
| 6,440,033 B1 | 8/2002 | Suhling et al. | |
| 6,457,866 B1 | 10/2002 | Scheibl | |
| 6,527,446 B2 | 3/2003 | Lee et al. | |
| 6,561,697 B2 | 5/2003 | Tsui | |
| 6,566,774 B2 | 5/2003 | Parmeter et al. | |
| 6,641,119 B2 * | 11/2003 | Kato | 267/140.12 |
| 6,682,060 B2 * | 1/2004 | Kato et al. | 267/141 |
| 6,793,050 B2 * | 9/2004 | Nylander et al. | 188/379 |
| 6,854,517 B2 | 2/2005 | Gay et al. | |
| 6,956,310 B1 | 10/2005 | Knox | |
| 7,066,651 B2 | 6/2006 | Nicholas et al. | |
| 7,309,163 B2 | 12/2007 | Dass | |
| 7,575,413 B2 | 8/2009 | Semple et al. | |
| 7,980,536 B2 * | 7/2011 | Haregoppa et al. | 267/137 |
| 8,038,540 B2 * | 10/2011 | Hoeks et al. | 464/180 |
| 2005/0223737 A1 | 10/2005 | Conry | |
| 2007/0140876 A1 | 6/2007 | Parmeter et al. | |

FOREIGN PATENT DOCUMENTS

| | | |
|---|---|---|
| JP | 2000-065062 A | 3/2000 |
| JP | 2004116335 A | 4/2004 |
| JP | 2007263124 A | 10/2007 |
| KR | 10-0839890 B1 | 6/2008 |
| KR | 10-0897787 B1 | 5/2009 |

* cited by examiner

TUNED BEARING

BACKGROUND OF THE INVENTION

1. Field of the Invention

This invention relates in general to bearings used in drilling and production equipment, and in particular to tuned bearings for use in motors driving electrical submersible pumps.

2. Prior Art

A submersible pump is a centrifugal pump having a submersible motor that rotates the shaft to drive the pump. The motors for high volume oil and water production may be from six to sixty feet in length and be rated at several hundred horsepower. Each motor has a stator secured within a tubular housing. The stator is made up of thin disks, called laminations that are magnetic and insulated from each other by coatings. Windings extend through the laminations to the stator.

A rotor secured to a shaft rotates within the stator. Because of the long length, the rotor is made up of a number of rotor sections. Each rotor section comprises a large number of flat metal disks, called laminations that are secured by copper rods. The disks are insulated from each other by coatings. The rotor sections are spaced apart from each other, and a bearing assembly is located between each rotor section to maintain the shaft in axial alignment. The rotor sections are keyed to the shaft for rotation with the shaft, but are axially movable with respect to the shaft.

Each bearing assembly includes a sleeve keyed to the shaft for rotation. A bearing body fits slidingly on the sleeve. An elastomeric ring, coil, or other mechanism encircles the bearing body in a groove acting to engage the stator and prevent the movement of the bearing body. The motor is filled with oil, and heated during operation, causing the elastomeric ring or other mechanism to expand and frictionally engage the inner wall of the stator. This engagement prevents the bearing body from rotating and supports the shaft in alignment.

As the motor begins to operate, the shaft will oscillate within the bearing according to the vibration frequency. Depending upon the oscillation frequency of the shaft, significant damage can occur to the bearing, shaft and stator bore due to vibration.

SUMMARY OF THE INVENTION

An electrical submersible pump motor and tuned bearing assembly is described herein. The electrical submersible pump motor according to an embodiment of the invention has a housing, a stator having magnetic laminations mounted therein for producing a magnetic field when supplied with electrical power, a rotatable shaft installed within the stator, a rotor installed in sections around the shaft and a bearing assembly, installed between the sections of the rotor. The bearing assembly according to an embodiment of the invention comprises a bearing body, the bearing body having an outer portion and a plurality of wing portions. The wing portions as circumferentially spaced apart to form a plurality of cavities in the bearing body. The hub has an upper side and a lower side and is partially separated from the bearing body by the cavities. A mass damper has an upper portion a lower portion and mass damper prongs connecting the upper and lower portion. The mass damper is installed around the hub with the upper portion disposed so as to circumscribe the upper side of the hub. The lower portion is disposed to circumscribe the lower side of the hub, and the mass damper prongs is disposed in the cavities.

BRIEF DESCRIPTION OF THE DRAWINGS

So that the manner in which the features and advantages of the invention, as well as others, which will become apparent, may be understood in more detail, a more particular description of the invention briefly summarized above may be had by reference to the embodiments thereof, which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

Figure 1:
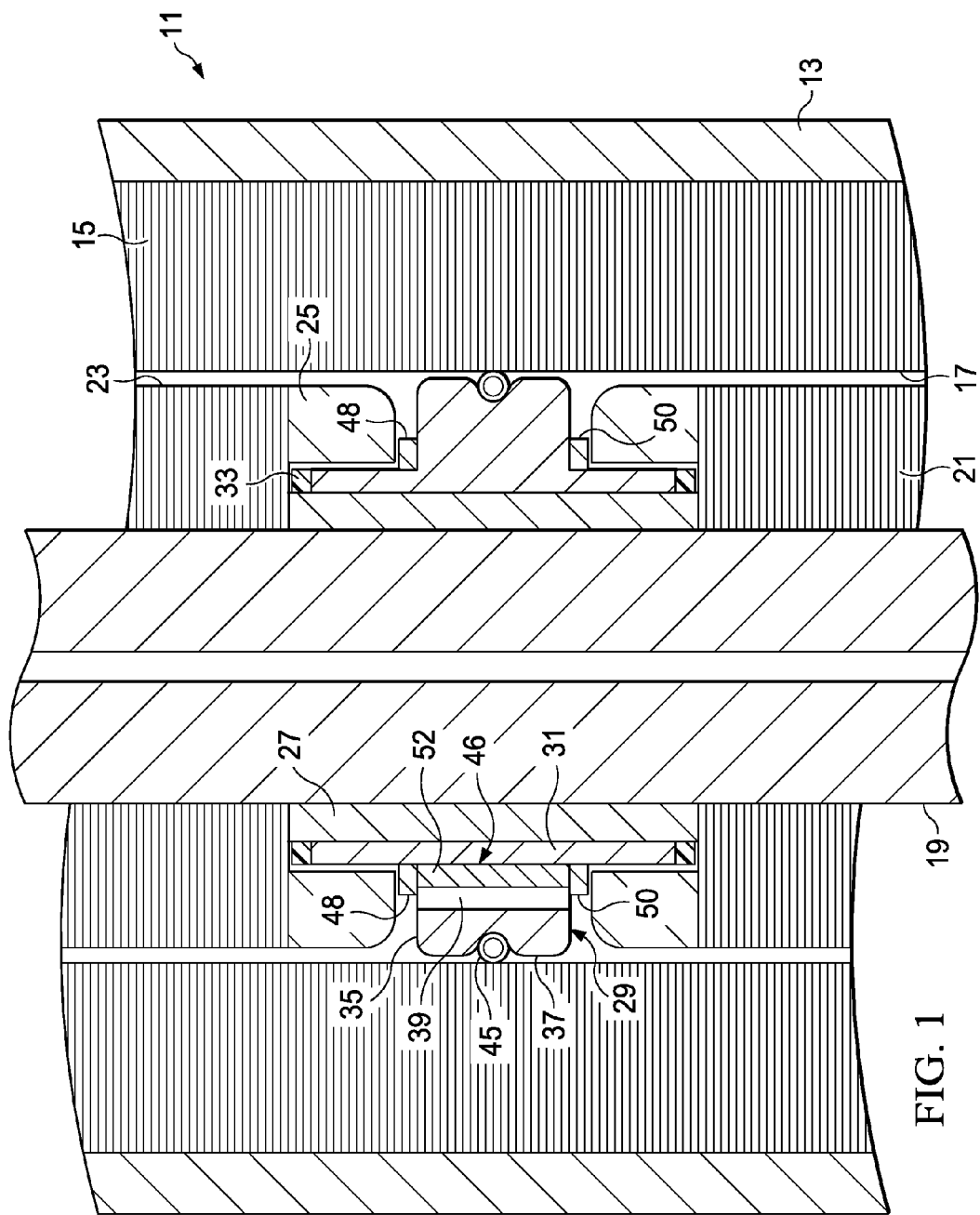
FIG. 1 is a cross-sectional view of an electrical submersible pump motor having a tuned bearing installed therein according to an embodiment of the instant invention.

Referring to FIG. 1, a motor having a conventional rotor and stator is shown, the rotor mounted to the stator using an embodiment of the novel tuned bearing of the instant invention. As shown, the motor 11 includes a cylindrical housing 13. A stator 15 is rigidly mounted within the housing 13. The stator 15 is made up of a number of flat metal disks, called laminations that are secured by copper rods. All the disks of the stator 15 are made from, e.g., magnetic steel. The disks of the stator 15 may be insulated from each other by coatings in the conventional mariner. The stator 15 has a cylindrical inner wall 17 that is of uniform constant diameter.

A rotor is rotatably mounted within the inner wall 17 of the stator 15. The rotor is comprised of a shaft 19 and a large number of metallic disks or laminations. The laminations are divided into identical rotor sections 21. A portion of two rotor sections 21 has an outer wall 23 that is closely spaced to the inner wall 17 of the stator 15. Each rotor section 21 is secured by, e.g., copper rods with copper end rings 25 on both sides. The ends of the copper rods are brazed or mechanically welded to the end rings 25 to hold the laminations in each rotor section 21 together.

Each rotor section 21 is secured by a key (not shown) to the shaft 19 for rotation therewith. The sections of the rotor 21 are not individually axially locked to the shaft 19. However, the lowermost section of rotor 21 at the end of the shaft 19 is axially locked to support the sections of the rotor 21 with respect to the shaft 19. Also, the uppermost section of the rotor 21 will be axially locked to the shaft 19.

Figure 2:
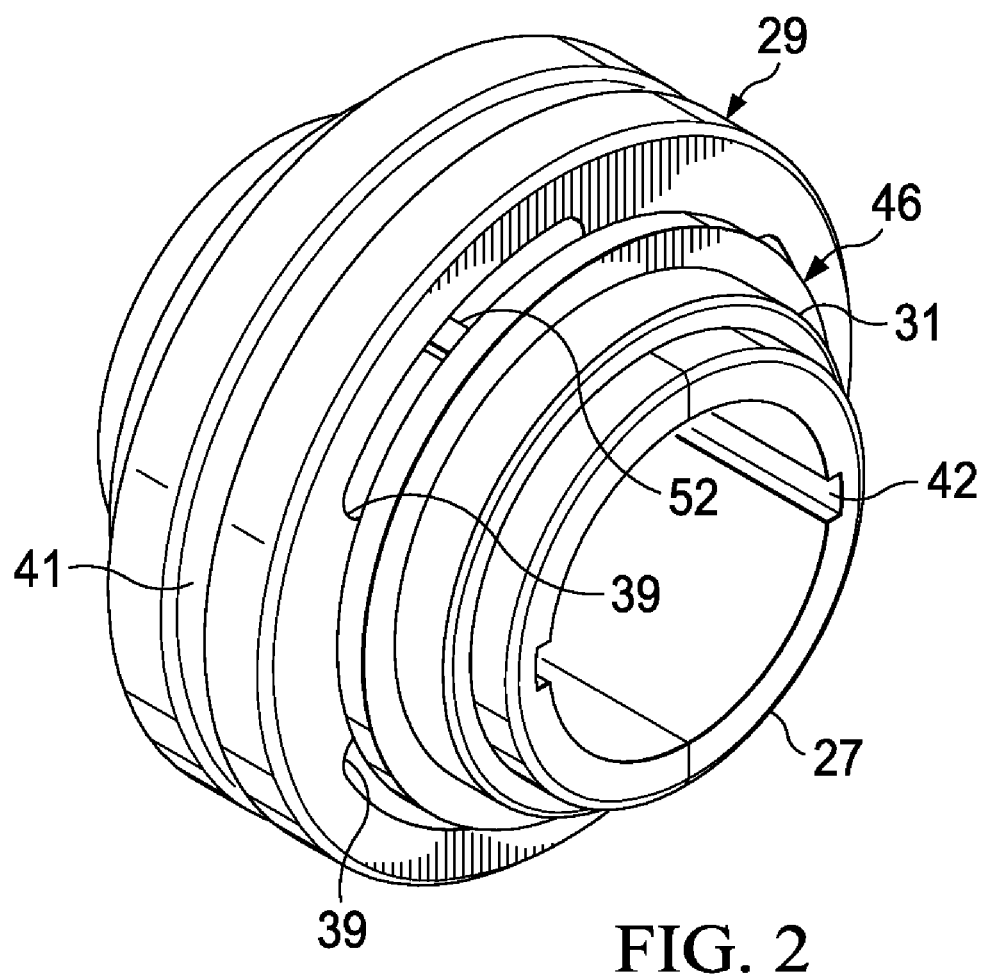
FIG. 2 is a perspective view of a tuned bearing including a mass damper according to an embodiment of the instant invention.
Figure 3:
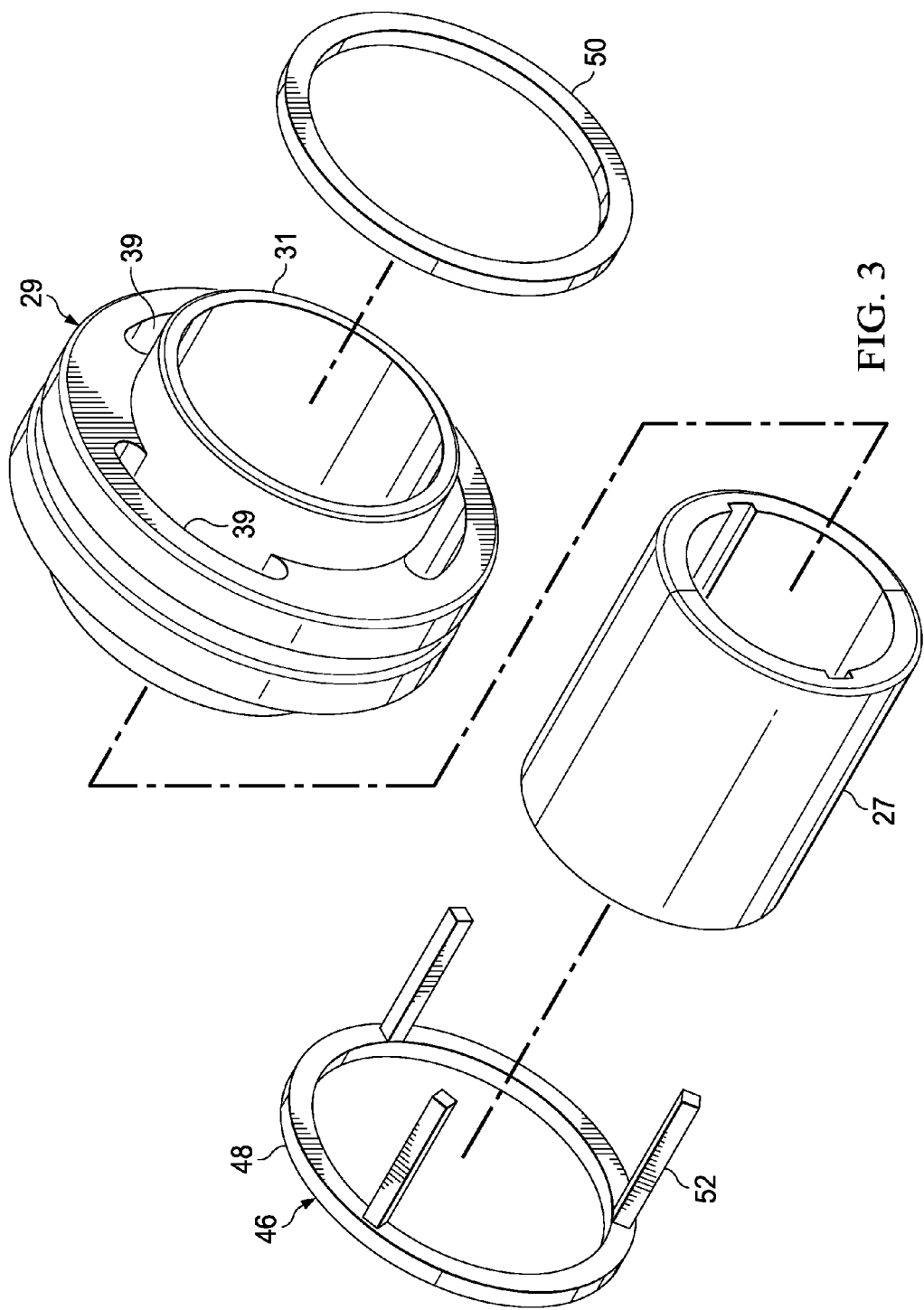
FIG. 3 is an exploded view of the tuned bearing of FIG. 2, showing a sleeve, bearing body and mass damper according to an embodiment of the instant invention.
Figure 4:
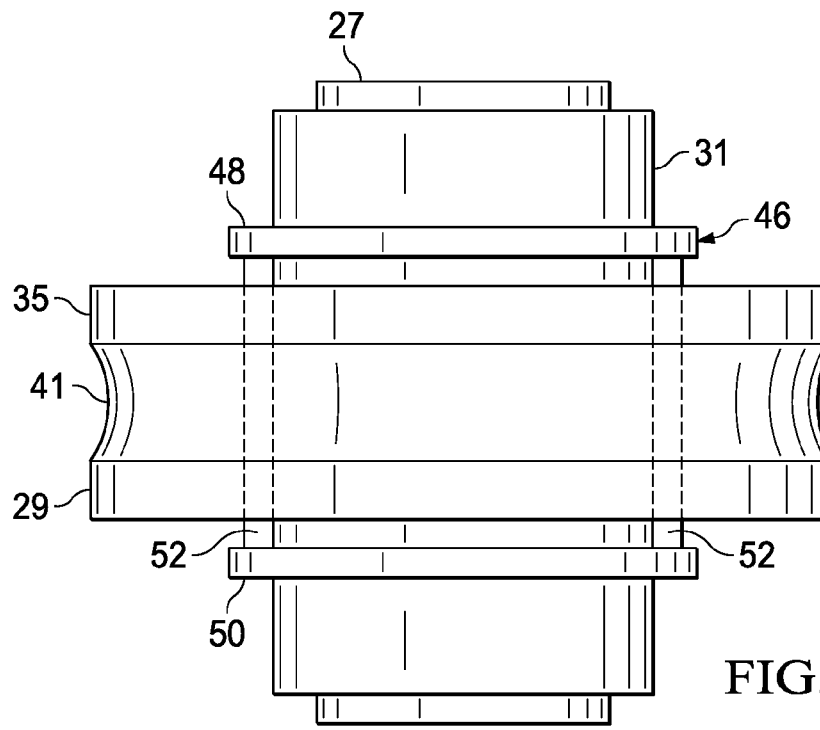
FIG. 4 is a side view of a tuned bearing showing a sleeve, bearing body, and mass damper according to an embodiment of the instant invention.
Figure 5:
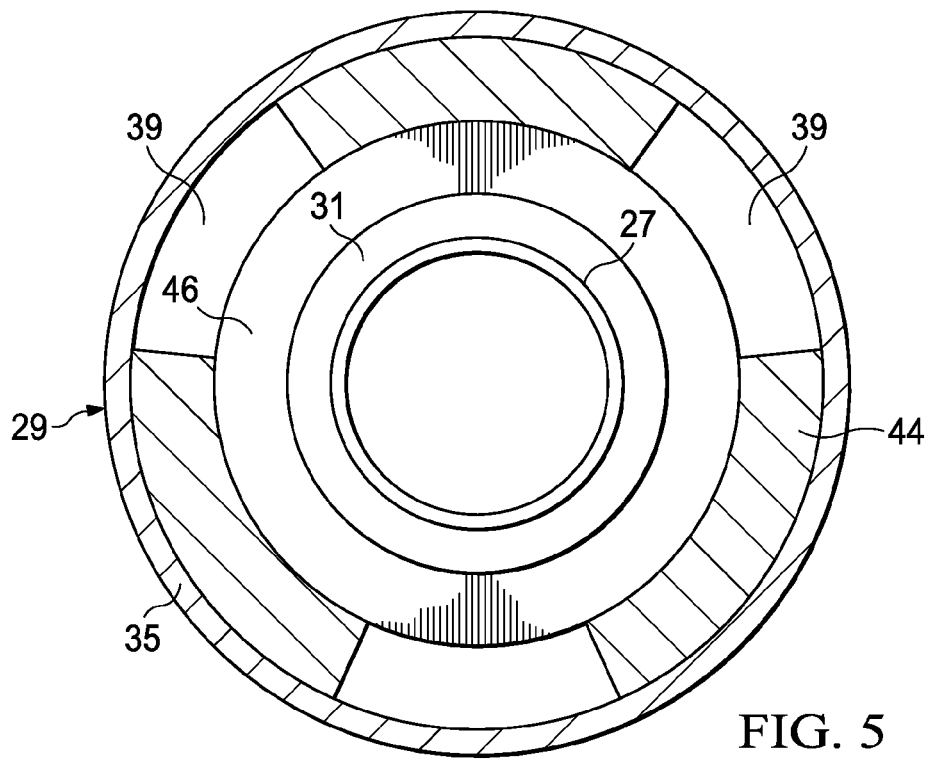
FIG. 5 is a top view of a tuned bearing showing a sleeve, bearing body, and mass damper according to an embodiment of the instant invention.

A tuned bearing assembly according to an embodiment of the invention is located between each of the rotor sections 21. The tuned bearing assembly includes a sleeve 27 that is secured to shaft 19 for rotation therewith by means of a key 42 (FIG. 2). Sleeve 27 may be, e.g., a bronze cylinder and is not axially locked to shaft 19. The upper edge or circular rim of sleeve 27 contacts the lowermost lamination of the section of rotor 21 directly above, and the lower edge of sleeve 27 contacts the uppermost lamination of the section of rotor 21 directly below. Therefore, the sleeve 27 supports the weight of the rotor sections 21 above and transmits any downward force on rotor sections 21 above to the next lower rotor section 21.

A hub or inner portion 31, which is part of bearing body 29, is located within the inner bore of each end ring 25, with a clearance between the end ring 25 inner diameter and the hub 31 outer diameter. Hub 31 is cylindrical and has less length than sleeve 27. Hub 31 is fabricated from, e.g., steel, and may be magnetic. A thrust washer 33 is located around the outer diameter of sleeve 27 and between the section of rotor 21 directly above and the upper edge of hub 31. A similar thrust washer 33 is located between the lower edge of hub 31 and the rotor section 21 directly below. Thrust washers 33 are preferably of a non-metallic material, such as glass reinforced phenolic material. The sleeve is longer than the bearing body, or hub, to prevent the hub from supporting the weight of the rotor sections 21 located above. The hub may be fabricated from e.g., a metallic material, preferably nitralloy.

Turning to the Figures, bearing body 29 has a flange or outer portion 35 that circumscribes a hub 31 with wing portions 44 extending therefrom. Wing portion 44 may be integrally found with the hub. Outer portion 35 has a cylindrical periphery 37 that is spaced inward from the inner wall 17 of stator 15 by a clearance of about 0.003 to 0.005 inch on the diameter. The longitudinal thickness or height of the outer portion 35 is less than the distance between the two adjacent end rings 25. A plurality of passages 39 extend between wing portions 44 for communicating oil contained within the housing 13. The passages 39 are created between the outer circumference of the hub 31 and the inner circumference of the outer portion 35 and wing portions 44, the passages 35 have a longer edge adjacent to the outer portion 35 and a shorter edge adjacent to the hub 31. As can be seen, the cross sectional view of the bearing body of FIG. 1, shows a passage 39 on one side, due to the equidistant spacing of the three passages 35. Bearing body 29 may be fabricated from, e.g., a metallic material, preferably nitralloy.

Referring to FIG. 2, the cylindrical periphery 37 of the outer portion 35 has an annular groove or cavity 41 extending circumferentially around bearing body 29 perpendicular to the axis of shaft 19. The annular groove or cavity 41 is substantially uniform in depth around the bearing body, in the outer portion 35. A coiled member or elastomeric member 45 (FIG. 1) may be recessed within the cavity 41. An elastomeric member (not shown) is sized to fit inside of the cavity 41 and maintain contact with both bearing body 29 and the inside wall 17 of the stator 15, thus the elastomeric member has a diameter greater than the radial extent of cavity 41. In the undeflected condition, the elastomeric member has a diameter that is greater than the radial depth of the cavity 41 so that an outer portion protrudes past the cylindrical periphery 37 of the bearing body 29. The diameter of the elastomeric member (not shown) is selected so that an outer portion of the elastomeric member 29 will contact inner wall 17 of stator 15 and deflect. The stiffness of the elastomeric member (not shown) is selected so that elastomeric member (not shown) will grip inner wall 17 of stator 15 with sufficient force to prevent bearing body 29 from spinning with the shaft 19. Alternatively, elastomeric member 45 may be a coiled member. In such embodiment, the space occupied by the coiled member (not shown) may form a toroid. The coiled member (not shown) is metallic, preferably of spring steel.

A mass damper 46 is shown disposed around the hub portion 31. The mass damper 46 includes a top portion 48, a bottom portion 50, and a plurality of spaced apart mass prongs 52 that connect the top portion 48 and bottom portion 50. As shown, the mass damper 46 is connected to the bottom portion 50 by inserting the mass prongs 52 through the plurality of passages 39. Assembled, the top portion 48 and bottom portion 50 circumscribe the hub 31, and rest below the end rings 25 when the bearing is disposed into the motor. The mass damper and tuned bearing assembly will be described in further detail below.

Referring to FIGS. 2-5, the tuned bearing assembly of the instant invention is shown in more detail. As can be seen, a mass damper 46 is shown disposed around the bearing hub 31, with top portion 48 and bottom portion 50 in contact with the bearing body 29. As can be seen, the plurality of spaced apart mass prongs 52 that connect the top portion 48 and bottom portion 50 are substantially equally spaced around the mass damper. The mass damper prongs 52 are inserted through the plurality of passages 39, and rest adjacent to the hub 31, with the top portion 48 and bottom portion 50 circumscribing the hub 31, and resting below the end rings 25 (FIG. 1) when the bearing is disposed into the motor. As such, the mass damper 46, hub 31, and sleeve 27 all comprise a smaller circumference than the outer circumference of the bearing body 29. The top portion and bottom portion of the mass damper 46 may be fabricated from any material suitable to achieve the damping characteristics desired, e.g., steel or polymer materials. Importantly, the mass damper is positioned and sized to frictionally fit to the bearing body 29 to remain static during the rotation of the shaft.

Each of the mass damper prongs 52 are selected so that each mass damper prong matches the operating vibrating frequency of the shaft. If the exiting frequency coming from the shaft matches the natural frequency of the mass damper installed on the bearing, the vibration on the shaft will cause the mass damper 46 to vibrate at its own natural frequency and therefore reduce the vibration on the sleeve/shaft. In other words, mass damper 46 causes the sleeve/shaft to oscillate closer to a zero amplitude at its operating frequency. To determine the appropriate material, shape and size of mass damping prongs 52 for a particular mass damper 46, the equivalent stiffness of a bar supported on its end with a load in-between is calculated using the following equation:

$$K_{eq} = 48 * E * I / (L^3) \qquad \text{(Eq. 1)}$$

where Keq=equivalent stiffness, E=young's modulus, and I is the second element.

The natural frequency of the system is then determined using the following equation:

$$wn = (K_{eq}/M)^{1/2}, \qquad \text{(Eq. 2)}$$

where wn=Natural Frequency and M=Mass.

Combining equations one and two, determines the appropriate shape and size for a mass damper prong 52, fabricated from a particular material, to tune a operating vibrating frequency, which may be synchronous, sub-synchronous, or above synchronous. To damp a synchronous vibration (1X) for a particular length of shaft:

$$L = (48/12 * E * b * (h^3) / ((w^2) * m))^{1/3} \qquad \text{(Eq. 3)}$$

As one skilled in the art will appreciate, equation three is true only for rectangular cross sections bars. However, the mass dampers could be designed on any shape as long as the inertia requirement is obtained. Nevertheless the rectangular shape bars provide a positive feature—the stiffness on one directions is very different from the stiffness on the perpendicular direction. This ensures the mass dampers only vibrate at the natural frequency of one of the directions The following table was generated using the different lengths and areas (B*H) for different type of materials of mass damping prongs so that the mass damping prong would damp a natural frequency of 60 Hz. Importantly, each of the materials described in the table may be used to fabricate the mass damper prongs 52.

Bar Supported on Both Ends

| Material | E [Pas] | b [m] | h [m] | w [rad/s] | mass [kg] | L [in] |
|---|---|---|---|---|---|---|
| Steel | 205000000 | 0.002 | 0.004 | 377 | 0.1 | 0.766703083 |
| ABS polycarbonate | 2500000 | 0.02 | 0.01 | 377 | 0.1 | 0.950522936 |
| ABS | 2500000 | 0.02 | 0.01 | 377 | 0.1 | 0.950522936 |
| ABS + 30% Glass Fiber | 7000000 | 0.02 | 0.01 | 377 | 0.1 | 1.339723816 |
| Acetal Copolymer | 2500000 | 0.02 | 0.01 | 377 | 0.1 | 0.950522936 |
| Acetal Copolymer + 30% Glass Fiber | 7500000 | 0.02 | 0.01 | 377 | 0.1 | 1.370891295 |
| Acrylic | 3000000 | 0.02 | 0.01 | 377 | 0.1 | 1.010081343 |
| Nylon 6 | 2300000 | 0.02 | 0.01 | 377 | 0.1 | 0.924467986 |
| Polyamide-Imide | 5000000 | 0.02 | 0.01 | 377 | 0.1 | 1.197583855 |
| Polycarbonate | 2300000 | 0.02 | 0.01 | 377 | 0.1 | 0.924467986 |
| Polyethylene, MDPE | 700000 | 0.02 | 0.01 | 377 | 0.1 | 0.62184471 |
| Polyethylene Terephthalate (PET) | 1000000 | 0.02 | 0.01 | 377 | 0.1 | 0.700351287 |
| Polyimide | 3000000 | 0.02 | 0.01 | 377 | 0.1 | 1.010081343 |
| Polyimide + Glass Fiber | 12000000 | 0.02 | 0.01 | 377 | 0.1 | 1.603404186 |
| Polypropylene | 1500000 | 0.02 | 0.01 | 377 | 0.1 | 0.801702093 |
| Polystyrene | 2500000 | 0.02 | 0.01 | 377 | 0.1 | 0.950522936 |

Because the vibration on a shaft could occur as an ellipse, so a mass damping prong 52 must be installed in the direction where the highest amplitude occurs. Accordingly, more than one mass damper prong 52 is installed on the bearing in different directions for each natural frequency. For example, a bearing tuned to damp the frequencies of 60, 90 and 120 Hz would have 9 mass damper prongs 52, with one for each frequency being installed in each of the plurality of passages 39 in, e.g., an equally spaced configuration. As can be seen in FIGS. 2-5, an exemplary damper body includes three wing sections 44, separated by passages 39 for accommodating at least three mass damper prongs. In such embodiments, each of the damper prongs may have a different mass, or be fabricated from different materials to achieve the appropriate damping characteristics. As such, the upper and lower portions of the hub may be fabricated from different materials as all or some of the prongs.

As one skilled in the art will appreciate, in alternative embodiments, the mass damper 46 may be cast as part of the bearing body. For example, the bearing body 29 may comprise the hub 31 and the mass damper 46 configured as a integral element. In such a configuration, the top portion, bottom portion and prongs of the mass damper 46 will not be separate components assembled around the bearing body. As such, the mass damper 46 may be cast with bearing body 29 so that the upper portion of the mass damper circumscribes the upper side of the hub 31, the lower portion of the mass damper circumscribes the lower side of the hub 31, and the mass damper prongs are formed in the cavities of the bearing body. In such embodiments, the damper prongs, top portion and bottom portion may be cast as the same material, with different masses for each prong, e.g., different (b×h) values.

During assembly, coiled member (not shown) is inserted into the bearing body cavity 41, and the mass damper is inserted around the bearing body 29. For example, mass damper 46 may be fabricated using an injection mold for the top portion and prongs and using another injection mold for the bottom portion with the bottom portion having slots for receiving the prongs. Accordingly, the mass damper 46 would be inserted around the bearing body by joining the prongs and bottom portion using, e.g., a friction fit, adhesive boding, welding, or the like. Alternatively, the mass damper 29 may be manufactured as part of the bearing body, via, e.g. casting the damper and bearing body together.

The sleeve 27 and bearing body 29 are assembled upon the shaft 19 between rotor sections 21. Then the rotor is inserted into the stator 15, with elastomeric member radically deflecting as it slides past the laminations of stator 15. Housing 13 is filled with oil, which fills passages 39. The elastomeric member will engage in contact with the bearing body cavity 41 and stator inner wall 17. In operation, sleeve 27 will rotate relative to the hub 31, which remains stationary. The frictional engagement due to deflection of the elastomeric member 45 prevents bearing body 29 from spinning with shaft 19. Because of the key, the sleeve 21 rotates with the shaft 19. Once the shaft 19 begins to rotate, vibrations along the shaft are transferred to the mass damper 46. The mass damper 46 will receive the vibration coming from the shaft 19 and start vibrating at its natural frequency, which will reduce the vibration amplitude coming from the shaft 19. Therefore, a more smooth film will be generated between sleeve 27 and hub 31 of bearing body 29 to increase the life of the bearing and protect the stators inner wall. In other words, the mass damper 46 acts to bring any oscillations in the shaft closer to a zero amplitude at its operating frequency.

The invention has significant advantages. The arrangement of the wing portions 44 along the bearing body 29 allow for the insertion of a mass damper around the hub, sleeve and shaft to absorb vibration frequencies. Moreover, while the embodiments of the invention have been shown connected to motor bearings, one of skill in the art will appreciate that each of the bearings of the instant invention could be used in other applications using bearings.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

That which is claimed is:

1. An electrical submersible pump motor, the electrical submersible pump motor having a stator having a rotatable shaft installed within the stator, a rotor installed in sections around the shaft, and a bearing assembly installed between the sections of the rotor, the bearing assembly comprising:
    a bearing body, the bearing body having a hub and an outer portion extending outward from the hub, the outer portion being in frictional engagement with the stator;
    a plurality of passages in the outer portion; and
    a mass damper, the mass damper having a upper portion, a lower portion and mass damper prongs connecting the upper and lower portion, the mass damper being installed around the hub with the upper portion disposed so as to circumscribe an upper portion of the hub, the lower portion being disposed to circumscribe a lower portion of the hub, and the mass damper prongs being disposed in the passages.

2. The electrical submersible pump motor according to claim 1, wherein the mass damper prongs are each sized to tune a specific vibration frequency of the shaft.

3. The electrical submersible pump motor according to claim 2, wherein three mass damper prongs are disposed along the mass damper, each of the prongs being tunable to a separate specific vibration frequency.

4. The electrical submersible pump motor according to claim 1, wherein the mass damper prongs are fabricated from steel.

5. The electrical submersible pump motor according to claim 1, wherein the mass damper prongs are fabricated from acrylic.

6. The electrical submersible pump motor according to claim 1, wherein each passage extends from the hub and is open at an outer periphery of the outer portion.

7. The electrical submersible pump motor according to claim 1, wherein the tuned bearing assembly further comprises a sleeve, the sleeve being receiving the shaft and located with the hub, the sleeve being rotatable with the shaft when the motor is in operation.

8. An electrical submersible pump motor, the electrical submersible pump motor having a stator having a rotatable shaft installed within the stator, a rotor installed in sections around the shaft, and a bearing assembly installed between the sections of the rotor, the bearing assembly comprising:
    a bearing body, the bearing body having a hub and outer portion and a plurality of wing portions, the plurality of wing portions having an edge close to the outer portion that is longer than the opposite edge of the wing portion so that the opposite edge of each wing portion forms a circular periphery that is smaller than the circumference of the outer portion; the plurality of wing portions being spaced apart from each of the other of the plurality of wing portions to form a plurality of cavities in the bearing body;
    a mass damper, the mass damper having an upper portion, a lower portion and mass damper prongs connecting the upper and lower portion, the mass damper being installed around the hub with the upper portion disposed so as to circumscribe an upper side of the hub, the lower portion being disposed to circumscribe a lower side of the hub, and the mass damper prongs being disposed in the cavities; and
    a sleeve, the sleeve arranged inside the hub, the sleeve being adapted to rotate within the hub.

9. The electrical submersible according to claim 8, wherein three mass damper prongs are disposed along the mass damper, each of the prongs tunable to a separate vibration frequency.

10. The electrical submersible pump motor according to claim 9, wherein the mass damper prongs are fabricated from steel.

11. The electrical submersible pump motor according to claim 9, wherein the mass damper prongs are fabricated from acrylic.

12. The electrical submersible pump motor according to claim 9, wherein the mass damper prongs are fabricated from a polymer.

13. The electrical submersible pump motor according to claim 8, wherein the tuned bearing assembly is adapted to operate within a motor, and the sleeve is adapted to receive a motor shaft and support a rotor assembly, the sleeve being frictionally engaged with the shaft so as to rotate with the shaft when the motor is in operation.

14. A method of damping a vibration frequency of a shaft disposed in an electrical submersible pump assembly, the method comprising the steps of:
    assembling a mass damper about the bearing body, the mass damper having an upper portion, a lower portion and mass damper prongs fabricated from the mass damper material connecting the upper and lower portion, the mass damper being disposed so the upper portion circumscribes the upper side of the hub, the lower portion circumscribes the lower side of the hub, and the mass damper prongs are formed in the cavities;
    disposing a bearing body about the rotor, the bearing body having a hub, an outer portion and a plurality of wing portions, the plurality of wing portions having an edge close to the outer portion that is longer than the opposite edge of the wing portion so that the opposite edge of each wing portion forms a circular periphery that is smaller than the circumference of the outer portion; the plurality of wing portions being spaced apart from each of the other of the plurality of wing portions to form a plurality of cavities in the bearing body; and
    determining at least one operating vibrating frequency of the shaft, selecting a mass damper material to damp the at least operating vibrating frequency of the shaft.

15. The method of claim 14, wherein the mass damper prongs are each sized to tune a specific vibration frequency.

16. The method of claim 14, wherein the operating vibrating frequency of the shaft, mass damper and bearing is calculated by determining a stiffness of the shaft, mass damper and bearing dividing the stiffness by a mass of the shaft mass damper and bearing.

17. The method of claim 14, wherein the natural frequency of the mass damper is used to determine the length and area of the prongs.

* * * * *